(12) United States Patent
Osawa et al.

(10) Patent No.: US 10,302,517 B2
(45) Date of Patent: May 28, 2019

(54) HYDRAULIC SENSOR ATTACHMENT STRUCTURE

(71) Applicant: Nidec Tosok Corporation, Zama-shi, Kanagawa (JP)

(72) Inventors: Tomoka Osawa, Zama (JP); Hironobu Wakabayashi, Zama (JP); Toshiaki Nakamura, Zama (JP); Ryunosuke Oikawa, Zama (JP)

(73) Assignee: NIDEK TOSOK CORPORATION, Kanagawa (JP)

( * ) Notice: Subject to any disclaimer, the term of this patent is extended or adjusted under 35 U.S.C. 154(b) by 2 days.

(21) Appl. No.: 15/820,537

(22) Filed: Nov. 22, 2017

(65) Prior Publication Data

US 2018/0149539 A1 May 31, 2018

(30) Foreign Application Priority Data

Nov. 25, 2016 (JP) .................................. 2016-229170

(51) Int. Cl.
*G01L 19/14* (2006.01)

(52) U.S. Cl.
CPC .......... *G01L 19/143* (2013.01); *G01L 19/144* (2013.01)

(58) Field of Classification Search
CPC .......................... G01L 19/143; G01L 19/144
See application file for complete search history.

(56) References Cited

U.S. PATENT DOCUMENTS

| | | | | | |
|---|---|---|---|---|---|
| 4,680,569 | A | * | 7/1987 | Yamaki | G01L 19/0084 338/36 |
| 6,439,058 | B1 | * | 8/2002 | Aratani | G01L 19/003 73/754 |
| 7,152,483 | B2 | * | 12/2006 | Mast | G01L 19/0084 73/754 |
| 9,352,958 | B2 | * | 5/2016 | Imai | B81B 7/0051 |
| 10,119,878 | B2 | * | 11/2018 | Osawa | G01L 19/0069 |
| 2004/0129085 | A1 | * | 7/2004 | Mundry | G01L 9/0051 73/726 |
| 2008/0257055 | A1 | * | 10/2008 | Giordano | D06F 39/087 73/722 |
| 2010/0186830 | A1 | | 7/2010 | Shigyo et al. | |

(Continued)

FOREIGN PATENT DOCUMENTS

JP  2010-174991 A  8/2010
JP  2015-96843 A  5/2015

*Primary Examiner* — Nathaniel T Woodward
(74) *Attorney, Agent, or Firm* — Keating & Bennett, LLP (57) ABSTRACT

A hydraulic sensor attachment structure includes an accommodating portion, a sensor case, and a lid disposed over the accommodating portion. In the hydraulic sensor attachment structure, an oil passage body includes the accommodating portion and a hydraulic pressure detection port. A hydraulic sensor includes a sensor main body, and the sensor case that covers the sensor main body. The accommodating portion includes a support portion that supports the hydraulic sensor from below. The sensor case includes a detection port portion. The accommodating portion includes a fastening portion and the lid includes a fastening portion. By fastening the fastening portion of the accommodating portion and the fastening portion of the lid by rotating the lid in one direction of the circumferential directions, the sensor case is held by the support portion and the lid in the up-down direction and is fixed to the oil passage body.

11 Claims, 9 Drawing Sheets

(56) References Cited

U.S. PATENT DOCUMENTS

2014/0238126 A1* 8/2014 Vanderaa ............... G01D 11/24
  73/431
2015/0137281 A1   5/2015 Imai et al.

* cited by examiner

HYDRAULIC SENSOR ATTACHMENT STRUCTURE

CROSS REFERENCE TO RELATED APPLICATIONS

This application claims the benefit of priority to Japanese Patent Application No. 2016-229170 filed on Nov. 25, 2016. The entire contents of this application are hereby incorporated herein by reference.

BACKGROUND OF THE INVENTION

1. Field of the Invention

The present disclosure relates to a hydraulic sensor attachment structure.

2. Description of the Related Art

A hydraulic control apparatus including a hydraulic sensor is known.

For example, as described in Japanese Unexamined Patent Application Publication No. 2010-174991, a hydraulic sensor is attached to a control valve provided with an oil passage. As a method of attaching the hydraulic sensor described above to the control valve, there is a method in which the hydraulic sensor is attached to the control valve from the outside of the control valve. Examples of such a method include a method in which a male screw portion is provided in the hydraulic sensor and the male screw portion of the hydraulic sensor is fastened from the outside of the control valve to a female screw hole provided in the control valve.

In the hydraulic control apparatus, since a high pressure is applied to the hydraulic sensor from the oil that is the subject of measurement, the hydraulic sensor needs to be attached to the control valve with a sufficient strength. Accordingly, in a case where the method described above in which the male screw portion of the hydraulic sensor is fastened to the female screw hole of the control valve is used, the length of a portion where both the screw portions are engaged needs to be sufficiently long, and the hydraulic sensor tends to become large. Accordingly, there is an issue of tendency of the overall hydraulic control apparatus being large in order to ensure sufficient attachment strength of the hydraulic sensor.

The present disclosure has been made in view of the above issue and an object thereof is to provide a hydraulic sensor attachment structure with which an increase in the overall size of the hydraulic control apparatus is suppressed while ensuring attachment strength of the hydraulic sensor.

SUMMARY OF THE INVENTION

In an aspect of a hydraulic sensor attachment structure of the present disclosure, the hydraulic sensor attachment structure attaches a hydraulic sensor that measures a pressure of oil flowing inside an oil passage to an oil passage body including the oil passage through which oil flows. The oil passage body includes an accommodating portion in which at least a portion of the hydraulic sensor is accommodated, and a hydraulic pressure detection port that is exposed to inside of the accommodating portion. The hydraulic pressure detection port connects the oil passage and the inside of the accommodating portion to each other. The accommodating portion includes a support portion that supports the hydraulic sensor from below. The hydraulic sensor includes a sensor main body and the sensor case that covers the sensor main body. The sensor case includes a detection port portion at an underside of the sensor case, the detection portion being connected to the hydraulic pressure detection port in a state in which the hydraulic sensor is attached to the oil passage body. The hydraulic sensor attachment structure includes the accommodating portion, the sensor case, and the lid disposed over the accommodating portion. The accommodating portion and the lid include fastening portions that are fastened to each other by being relatively rotated in circumferential directions about a central axis that extends in an up-down direction. The sensor case is held by the support portion and the lid in the up-down direction and is fixed to the oil passage body by fastening the fastening portion of the accommodating portion and the fastening portion of the lid by rotating the lid in one direction of circumferential directions.

The above and other elements, features, steps, characteristics and advantages of the present invention will become more apparent from the following detailed description of the preferred embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

A central axis J illustrated in the drawings is a virtual axis that extends in the up-down direction. In the description hereinafter, a direction that is parallel to the central axis J will be merely referred to as an "axial direction (up-down direction)", a direction extending in a radial direction about the central axis J will be merely referred to as a "radial direction", and circumferential directions about the central axis J will be merely referred to as "circumferential directions". Furthermore, in the axial direction, the upper side in FIG. 1 will be merely referred to as an "upper side", and the lower side in FIG. 1 will be merely referred to as a "lower side". Note that the upper side and the lower side are terms that are used for description only, and the actual positional relationships and the like may be those other than the positional relationships depicted by the above terms.

First Exemplary Embodiment

Figure 2:
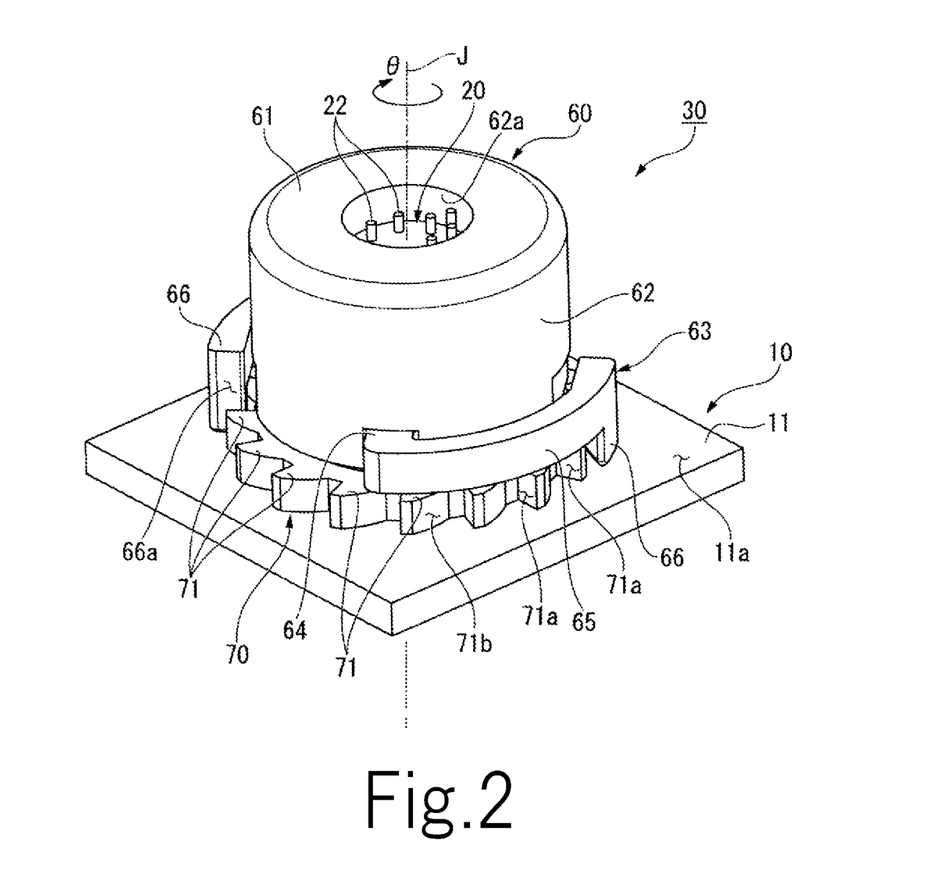
FIG. 2 is a perspective view illustrating the hydraulic sensor attachment structure of the first exemplary embodiment.
Figure 3:
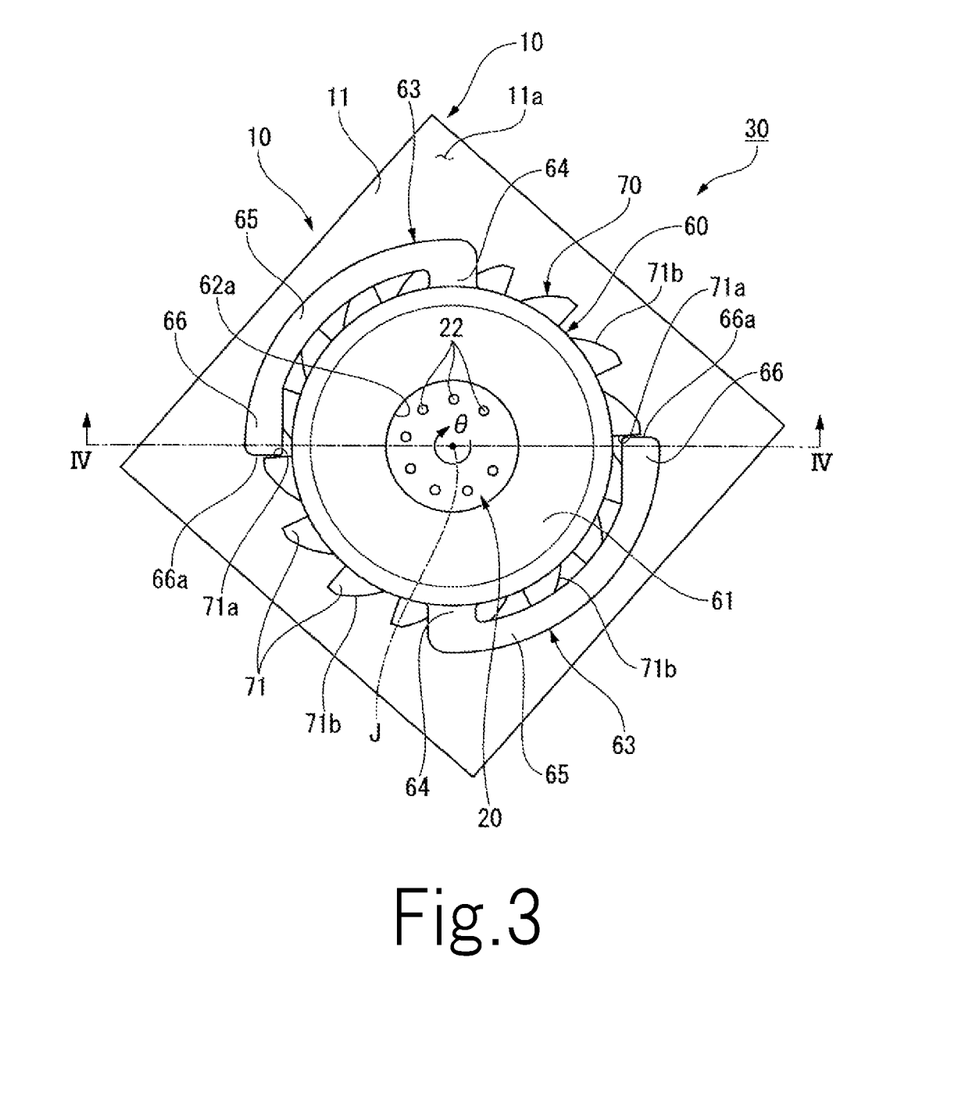
FIG. 3 is a drawing viewing the hydraulic sensor attachment structure of the first exemplary embodiment from above.
Figure 4:
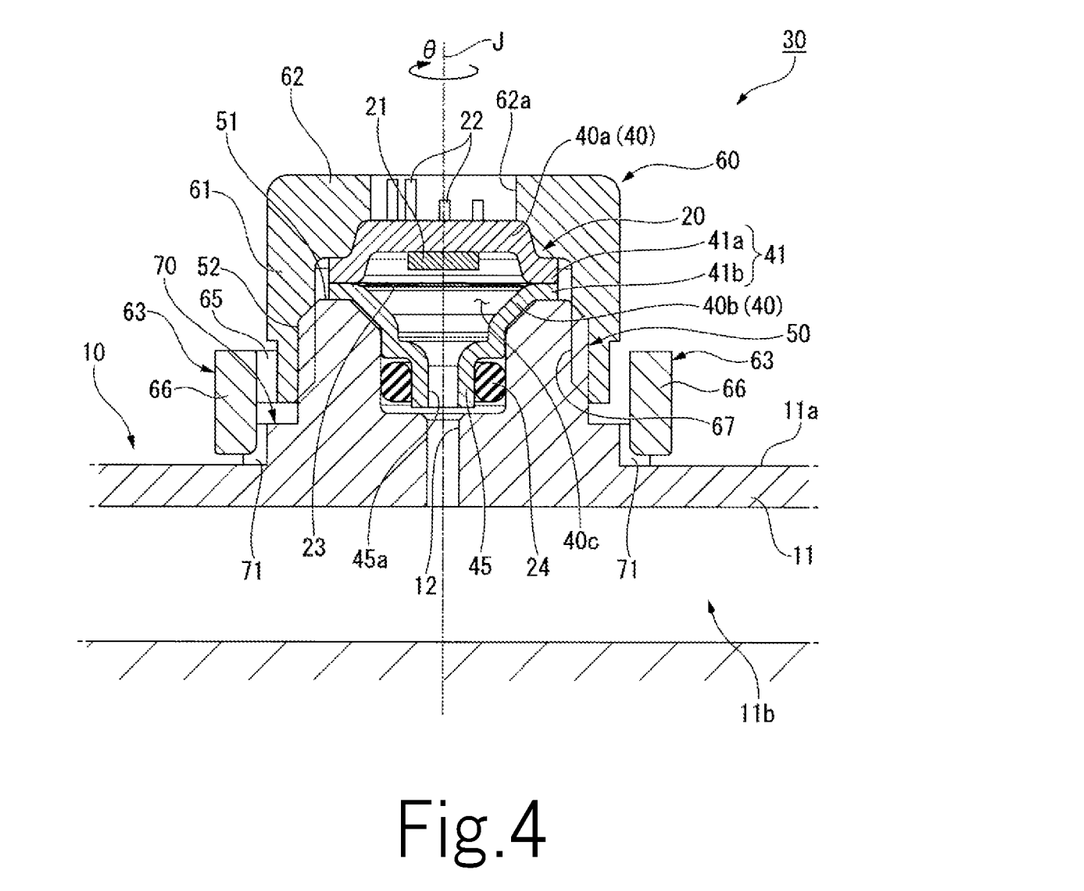
FIG. 4 is a drawing illustrating the hydraulic sensor attachment structure of the first exemplary embodiment and is a sectional view taken along line IV-IV in FIG. 3.

A hydraulic sensor attachment structure 30 of the present exemplary embodiment illustrated in FIGS. 1 to 4 attaches a hydraulic sensor 20 to a control valve 10 of a hydraulic control apparatus. More specifically, the hydraulic sensor attachment structure 30 attaches the hydraulic sensor 20 from an upper surface 11a side of an oil passage body 11 of the control valve 10. As illustrated in FIG. 4, the oil passage body 11 includes therein an oil passage 11b through which oil flows. The hydraulic sensor 20 measures the pressure of the oil flowing inside the oil passage 11b. The oil passage body 11 includes a hydraulic pressure detection port 12 that is in communication with the oil passage 11b. The hydraulic pressure detection port 12 is exposed to the inside of an accommodating portion 50 described later, and connects the oil passage 11b and the inside of the accommodating portion 50 to each other. The hydraulic pressure detection port 12 has a circular shape formed about the central axis J.

Figure 1:
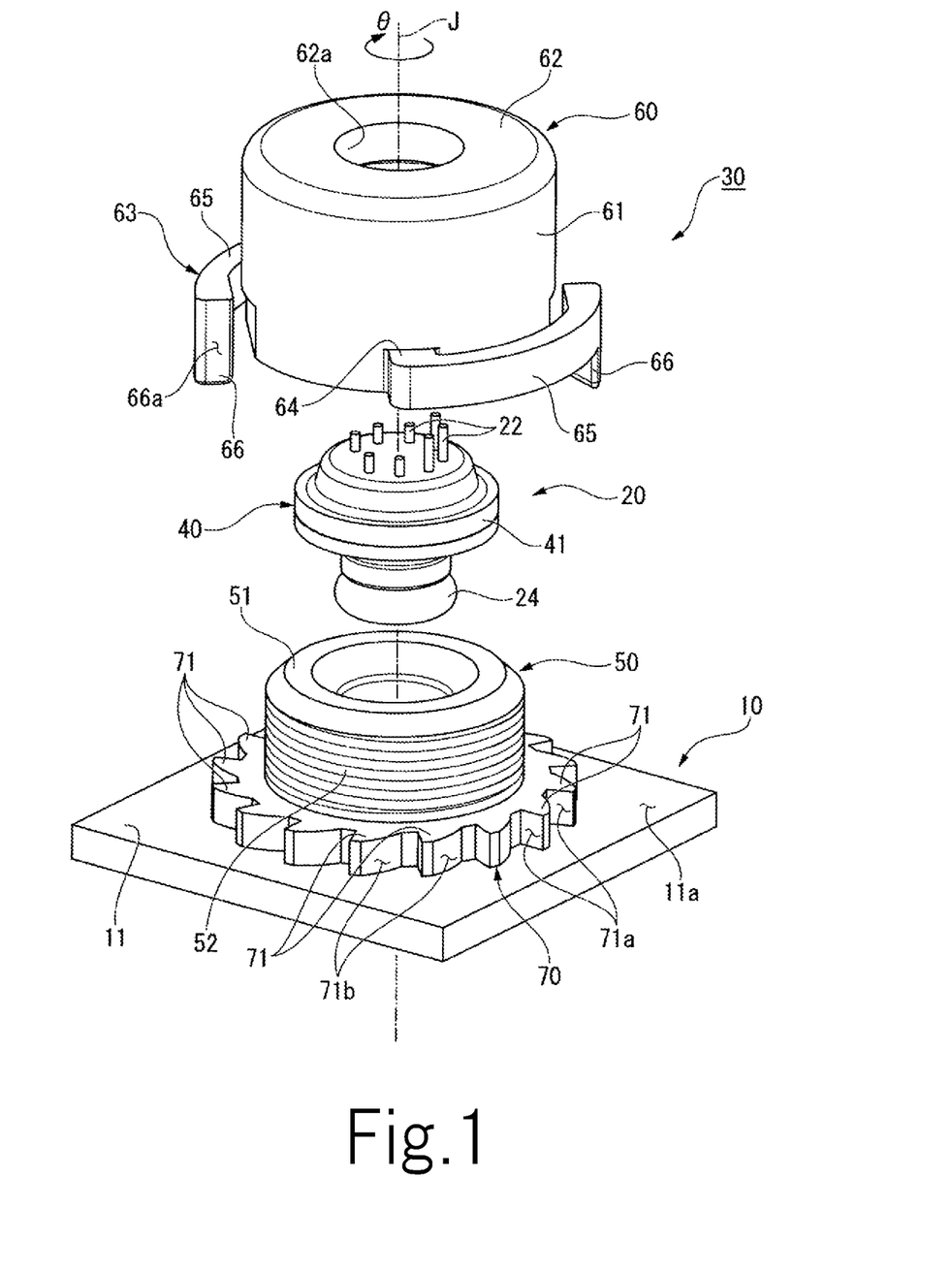
FIG. 1 is a perspective view illustrating a hydraulic sensor attachment structure of a first exemplary embodiment.

FIG. 1 illustrates a state before the hydraulic sensor 20 is attached to the oil passage body 11. FIGS. 2 to 4 illustrate a state in which the hydraulic sensor 20 has been attached to the oil passage body 11 with the hydraulic sensor attachment structure 30. Note that hereinafter, the state before the hydraulic sensor 20 is attached to the oil passage body 11 is referred to as an "unattached state", and the state in which the hydraulic sensor 20 has been attached to the oil passage body 11 with the hydraulic sensor attachment structure 30 is referred to as an "attached state". The hydraulic sensor attachment structure 30 includes the accommodating portion 50 included in the oil passage body 11, a sensor case 40 of the hydraulic sensor 20, a first rotation suppressing portion 70, and a lid 60.

As illustrated in FIG. 1, the accommodating portion 50 has a tubular shape that protrudes from the upper surface 11a of the oil passage body 11 towards the upper side with the central axis J as the center. The accommodating portion 50 has, for example, a cylindrical shape. The accommodating portion 50 is open upward. In the attached state, at least a portion of the hydraulic sensor 20 is accommodated inside the accommodating portion 50. In FIG. 4, a lower portion of the hydraulic sensor 20 is accommodated in the accommodating portion 50. The accommodating portion 50 includes a support portion 51, and a male screw portion 52 serving as a fastening portion.

The support portion 51 is a portion that supports the hydraulic sensor 20 from under. In the present exemplary embodiment, the support portion 51 is an upper end portion of the accommodating portion 50. As illustrated in FIG. 1, the male screw portion 52 is provided on an outer surface of the accommodating portion 50 in the radial direction. The male screw portion 52 is a helical screw portion that extends in the circumferential directions along the outer surface of the accommodating portion 50 in the radial direction. The male screw portion 52 is a screw portion in which a female screw portion 67 described later moves downwards relative to the male screw portion 52 when the female screw portion 67 engaged with the male screw portion 52 is rotated in an arrow θ direction of the circumferential directions.

The arrow θ direction of the circumferential directions in the present exemplary embodiment corresponds to one direction of the circumferential directions. Furthermore, a direction opposite to the arrow θ direction of the circumferential directions corresponds to another direction of the circumferential directions.

In the description hereinafter, the arrow θ direction of the circumferential directions is merely referred to as a "+θ direction", and the direction opposite to the arrow θ direction of the circumferential directions is merely referred to as a "−74 direction".

As illustrated in FIG. 4, the hydraulic sensor 20 includes the sensor case 40, a sensor main body 21, connection terminals 22, a diaphragm 23, and an O-ring 24. The sensor case 40 covers the sensor main body 21. The sensor case 40 includes a lower case 40b and an upper case 40a. The lower case 40b has a tubular shape open on both sides in the axial direction. A lower end portion of the lower case 40b is a small-diameter portion 45 where the outside diameter becomes smaller. The small-diameter portion 45 is open downward. In the attached state, the inside of the small-diameter portion 45 is a detection port portion 45a connected to the hydraulic pressure detection port 12. In other words, the sensor case 40 includes the detection port portion 45a on a lower surface thereof. An upper end portion of the lower case 40b is a lower side supported portion 41b that protrudes outwardly in the radial direction.

The upper case 40a is fixed to the upper end portion of the lower case 40b. The upper case 40a has a saucer shape that is depressed upward. The upper case 40a covers the opening on the upper side of the lower case 40b. A lower end portion of the upper case 40a is an upper side supported portion 41a that protrudes outwardly in the radial direction. The upper case 40a and the lower case 40b are fixed to each other by placing and fixing the upper side supported portion 41a on top of the lower side supported portion 41b in the axial direction. A supported portion 41 protruding outwardly in the radial direction is constituted by the upper side supported portion 41a and the lower side supported portion 41b.

An accommodation space 40c is provided between the upper case 40a and the lower case 40b in the axial direction. The accommodation space 40c is partitioned in the axial direction with the diaphragm 23. The sensor main body 21 is installed on an underside of the upper case 40a and inside an upper portion of the accommodation space 40c. Inside the upper portion of the accommodation space 40c is filled with a liquid for transmitting pressure. In the attached state, oil flows into a lower portion of the accommodation space 40c through the detection port portion 45a connected to the hydraulic pressure detection port 12. The pressure of the oil that has flowed into the lower portion of the accommodation space 40c is applied to the sensor main body 21 through the diaphragm 23 and the liquid for transmitting pressure. With the above, the hydraulic pressure of the oil inside the oil passage 11b can be measured by the sensor main body 21.

The connection terminals 22 protrude upwards from an upper surface of the upper case 40a. The connection terminals 22 are provided in a plural number. As illustrated in FIG. 3, the plurality of connection terminals 22 are arranged side-by-side in the circumferential directions. Although not illustrated, the connection terminals 22 are connected to an external device such as a power supply (not shown) and electrically connect the external device and the sensor main body 21 to each other.

The first rotation suppressing portion 70 is provided on the oil passage body 11. As illustrated in FIG. 1, the first rotation suppressing portion 70 has a gear shape including a plurality of teeth 71 that protrude outwardly in the radial direction. The first rotation suppressing portion 70 is disposed outside the accommodating portion 50 in the radial direction so as to surround the accommodating portion 50. In the present exemplary embodiment, the first rotation suppressing portion 70 protrudes outwardly in the radial direction from an outer peripheral surface at the lower end of the accommodating portion 50. An underside of the first rotation suppressing portion 70 is connected to the upper surface 11a of the oil passage body 11.

The plurality of teeth 71 are arranged side-by-side equidistantly in a full circle in the circumferential directions. As illustrated in FIG. 3, the shape of the teeth 71 viewed in the axial direction is a saw-like shape. The teeth 71 each include a first contact surface 71a that is oriented in the +θ direction, and an inclined surface 71b that is oriented in the −θ direction. The first contact surfaces 71a are end surfaces on the +θ direction side of the teeth 71 in the circumferential directions. The inclined surfaces 71b are end surfaces on the −θ direction side of the teeth 71 in the circumferential directions. The first contact surfaces 71a are flat surfaces orthogonal to the circumferential directions. Note that the first contact surfaces 71a may be curved surfaces, for example. As each inclined surface 71b extends from the inner side in the radial direction towards the outer side in the radial direction, the inclined surface 71b extends so as to be positioned on the +θ direction side. The inclined surfaces 71b are curved surfaces that are curved in the +θ direction from the inner side in the radial direction from the outer side in the radial direction.

In the present exemplary embodiment, the first rotation suppressing portion 70 is provided together with the oil passage body 11 as a single member. Note that the first rotation suppressing portion 70 may be provided as a member separate from the oil passage body 11 and may be fixed to the upper surface 11a of the oil passage body 11.

As illustrated in FIG. 1, the lid 60 has a lidded tubular shape open on the lower side. The lid 60 is disposed over the accommodating portion 50. The lid 60 is formed of resin, for example. The lid 60 includes a first cylindrical portion 61, a lid portion 62, and second rotation suppressing portions 63. The first cylindrical portion 61 has a cylindrical shape formed about the central axis J. As illustrated in FIG. 4, the female screw portion 67 serving as a fastening portion is provided on an inner surface of the first cylindrical portion 61 in the radial direction. In other words, the lid 60 includes the female screw portion 67. The female screw portion 67 is a helical screw portion extending in the circumferential directions along the inner surface of the first cylindrical portion 61 in the radial direction. The female screw portion 67 is engaged with the male screw portion 52. The female screw portion 67 and the male screw portion 52 are fastened to each other by being relatively rotated in the circumferential directions. The lid portion 62 is connected to an upper end portion of the first cylindrical portion 61.

The lid portion 62 includes a through hole 62a that penetrates the lid portion 62 in the axial direction. The through hole 62a has a circular shape formed about the central axis J. In the attached state, the connection terminals 22 are exposed to the outside of the lid 60 through the through hole 62a. With the above, wires and the like can be connected to the connection terminals 22 after the hydraulic sensor 20 has been attached to the oil passage body 11.

As illustrated in FIG. 1, the second rotation suppressing portions 63 each include a connecting portion 64, a first arm portion 65, and a first hook portion 66. Each connecting portion 64 protrudes from an outer surface of the first cylindrical portion 61 in the radial direction towards the outer side in the radial direction. More specifically, each connecting portion 64 protrudes from a lower end of the outer surface of the first cylindrical portion 61 in the radial direction towards the outer side in the radial direction. The first arm portions 65 extend in the circumferential direction (the −θ direction) from outer end portions of the connecting portion 64 in the radial direction. As illustrated in FIG. 3, each first arm portion 65 has a substantially quadrant arc shape. In the axial direction, the first arm portions 65 overlap outer end portions of the teeth 71 in the radial direction. The outer ends of the first arm portions 65 in the radial direction are disposed outside of the teeth 71 in the radial direction. The first arm portions 65 can be elastically deformed in the radial direction. As illustrated in FIG. 4, undersides of the first arm portions 65 are, in the axial direction, disposed at a position that is the same as that of a lower end of the first cylindrical portion 61.

As illustrated in FIG. 1, each first hook portion 66 protrudes downwards from a distal end portion of the corresponding first arm portion 65 in the circumferential direction, in other words, from an end portion on the −θ direction side in the present embodiment. Each first hook portion 66 incudes a second contact surface 66a. In the present exemplary embodiment, the second contact surfaces 66a are end surfaces on the −θ direction side of the first hook portions 66 in the circumferential directions. The second contact surfaces 66a are flat surfaces orthogonal to the circumferential directions. Note that the second contact surfaces 66a may be curved surfaces, for example.

As illustrated in FIG. 4, lower ends of the first hook portions 66 protrude below the lower end of the first cylindrical portion 61. In the attached state, the second contact surfaces 66a can be in contact with the first contact surfaces 71a. Recesses that are depressed inwardly in the radial direction are provided in portions of the outer surface of the first cylindrical portion 61 in the radial direction that opposes the first hook portion 66 with a gap in the radial direction in between.

As illustrated in FIG. 3, in the present embodiment, a pair of second rotation suppressing portions 63 having the central axis J interposed therebetween in the radial direction are provided. The pair of second rotation suppressing portions 63 are disposed in a rotationally symmetrical manner about the central axis J.

A worker performing attaching (hereinafter, referred to simply as the "worker") first disposes the hydraulic sensor 20 in the accommodating portion 50. As illustrated in FIG. 1, the worker takes the hydraulic sensor 20 close to the accommodating portion 50 from above, and accommodates the lower portion of the hydraulic sensor 20 inside the accommodating portion 50. As illustrated in FIG. 4, in a state in which the lower portion of the hydraulic sensor 20 is accommodated inside the accommodating portion 50, the supported portion 41 comes into contact with the support portion from above. With the above, the hydraulic sensor 20 is supported by the support portion 51 from below. The 0-ring 24 held between an inner surface of the accommodating portion 50 in the radial direction and an outer surface of the small-diameter portion 45 in the radial direction is compressed and is elastically deformed in the radial direction. With the above, a portion between the sensor case 40 and the inner surface of the accommodating portion 50 in the radial direction is sealed and leakage of the oil that has flowed into the accommodating portion 50 from the hydraulic pressure detection port 12 to the outside of the accommodating portion 50 is prevented or reduced.

Subsequently, the worker covers the lid 60 over the accommodating portion 50 from above and engages the female screw portion 67 with the male screw portion 52. Subsequently, the worker rotates the lid 60 in the +θ direction with respect to the accommodating portion 50. With the above, the female screw portion 67 is fastened to the male screw portion 52, and the lid 60 is moved downward. The worker rotates the lid 60 in the +θ direction and fastens the lid 60 until the lid portion 62 comes into contact with the sensor case 40 from above, as illustrated in FIG. 4. In the present embodiment, the lid portion 62 comes into contact with the upper side supported portion 41a. With the above, the supported portion 41 is held between the lid portion 62 and the support portion 51 in the axial direction, and the sensor case 40 is fixed to the accommodating portion 50. As described above, the sensor case 40 is held between the support portion 51 and the lid 60 in the axial direction and is fixed to the oil passage body 11 by rotating the lid 60 in the +θ direction and fastening the male screw portion 52 of the accommodating portion 50 and the female screw portion 67 of the lid 60 to each other.

The worker can attach the hydraulic sensor 20 to the oil passage body 11 with the hydraulic sensor attachment structure 30 in the above manner. In the attached state, the first cylindrical portion 61 is disposed outside of the accommodating portion 50 in the radial direction. The lower end of the first cylindrical portion 61 is disposed above the first rotation suppressing portion 70 with a gap in between.

In the present exemplary embodiment, the hydraulic sensor 20 is held by the support portion 51 and the lid 60 by fastening the male screw portion 52 serving as a fastening portion of the accommodating portion 50 and the female screw portion 67 serving as a fastening portion of the lid 60 to each other; accordingly, the hydraulic sensor 20 can be fixed to the oil passage body 11 firmly. Furthermore, at least a portion of the hydraulic sensor 20 is accommodated inside the accommodating portion 50 including the male screw portion 52. Accordingly, for example, compared with a case in which a male screw portion that extends downwards from a lower end of the hydraulic sensor 20 is provided, the overall hydraulic sensor attachment structure 30 can be made small in size in the axial direction. With the above, an increase in the size of the hydraulic sensor attachment structure 30 in the axial direction can be suppressed while dimensions of a portion where the male screw portion 52 and the female screw portion 67 are engaged in the axial direction are ensured to provide sufficient strength. Accordingly, the present exemplary embodiment can provide the hydraulic sensor attachment structure 30 that is capable of suppressing an increase in the overall size of the hydraulic control apparatus while obtaining attachment strength of the hydraulic sensor 20.

In the present embodiment, the accommodating portion 50 has a tubular shape that protrudes upwards from the upper surface 11a of the oil passage body 11. Accordingly, for example, compared with a case in which the accommodating portion is a hole portion depressed downward from the upper surface 11a of the oil passage body 11, thicknesses of portions of the oil passage body 11 other than where the accommodating portion is provided can be made small. As illustrated in FIG. 4, in the attached state, the lower ends of the first hook portions 66 are disposed below an upper surface of the first rotation suppressing portion 70. With the above, as illustrated in FIGS. 2 and 3, the first hook portions 66 are inserted between the teeth 71 adjacent with each other in the circumferential directions, and are caught by the teeth 71. In other words, the second rotation suppressing portions 63 are caught by the first rotation suppressing portion 70. In the attached state in which the sensor case 40 is held between the support portion 51 and the lid 60 in the axial direction and is fixed to the oil passage body 11, the first rotation suppressing portion 70 and the second rotation suppressing portions 63 are hooked to each other, and the rotation of the lid 60 against the accommodating portion 50 in the −θ direction is suppressed. Accordingly, loosening of the fastening between the male screw portion 52 and the female screw portion 67 caused by hydraulic pressure, oil vibration, and the like applied by the oil can be suppressed. With the above, a state in which the hydraulic sensor 20 is fixed firmly can be maintained in a suitable manner. As illustrated in FIG. 4, in the attached state, the first hook portions 66 are each disposed above the upper surface 11a of the oil passage body 11 with a gap in between.

As illustrated in FIG. 3, in the first hook portions 66, the second contact surfaces 66a oppose the first contact surfaces 71a in the circumferential directions, and are caught by the teeth 71. Accordingly, when the lid 60 starts to rotate in the −θ direction, the second contact surfaces 66a come into contact with the first contact surfaces 71a, and the rotation of the lid 60 in the −θ direction is suppressed.

Meanwhile, since the first contact surfaces 71a are oriented in the +θ direction, the second contact surfaces 66a do not come into contact with the first contact surfaces 71a during rotation of the lid 60 in the +θ direction until the attached state is reached. With the above, when rotating the lid 60 in the +θ direction until the attached state is reached, the rotation is not suppressed by the first contact surfaces 71a. Furthermore, since the first arm portions 65 can be elastically deformed, when the first hook portions 66 come into contact with the teeth 71, the first arm portions 65 are elastically deformed; accordingly, the first hook portions 66 are not easily caught by the teeth 71. With the above, while rotation of the lid 60 in the −θ direction being suppressed, rotation of the lid 60 in the +θ direction can be facilitated.

Particularly, in the present exemplary embodiment, since the first arm portions 65 can elastically deform in the radial direction, when the first hook portions 66 come into contact with the teeth 71 while the lid 60 is rotated in the +θ direction, the first hook portions 66 are pushed towards the outer side in the radial direction and the first arm portions 65 are elastically deformed towards the outer side in the radial direction. Furthermore, the first hook portions 66 are elastically displaced to the outer side with respect to the teeth 71 in the radial direction, and are moved over the teeth 71 in the +θ direction. With the above, the lid 60 can be rotated in the +θ direction. In the present embodiment, since the surfaces of the teeth 71 on the -θ direction side are inclined surfaces in which the inclined surfaces 71b extend so as to be positioned on the +θ direction side as the inclined surfaces 71b extend from the inner sides in the radial direction towards the outer sides in the radial direction, the first hook portions 66 can move more easily along the inclined surfaces 71b towards the outer side in the radial direction. Accordingly, the first hook portions 66 can move over the teeth 71 more easily when the lid 60 is rotated in the +θ direction. Accordingly, rotation of the lid 60 in the +θ direction is facilitated further.

As described above, in the present embodiment, the first rotation suppressing portion 70 and the second rotation suppressing portions 63 constitute a ratchet mechanism that permits the lid 60 to rotate against the accommodating portion 50 in the +θ direction and suppresses the rotation of the lid 60 against the accommodating portion 50 in the −θ direction. Accordingly, the male screw portion 52 and the female screw portion 67 can be fastened more easily, and loosening of the fastening between the male screw portion 52 and the female screw portion 67 can be suppressed in a further suitable manner.

The present disclosure is not limited to the exemplary embodiment described above, and other configurations may be employed. In the description hereinafter, descriptions of configurations that are similar to those in the above description may be omitted by, for example, attaching the same reference numerals as appropriate.

Second Exemplary Embodiment

Figure 5:
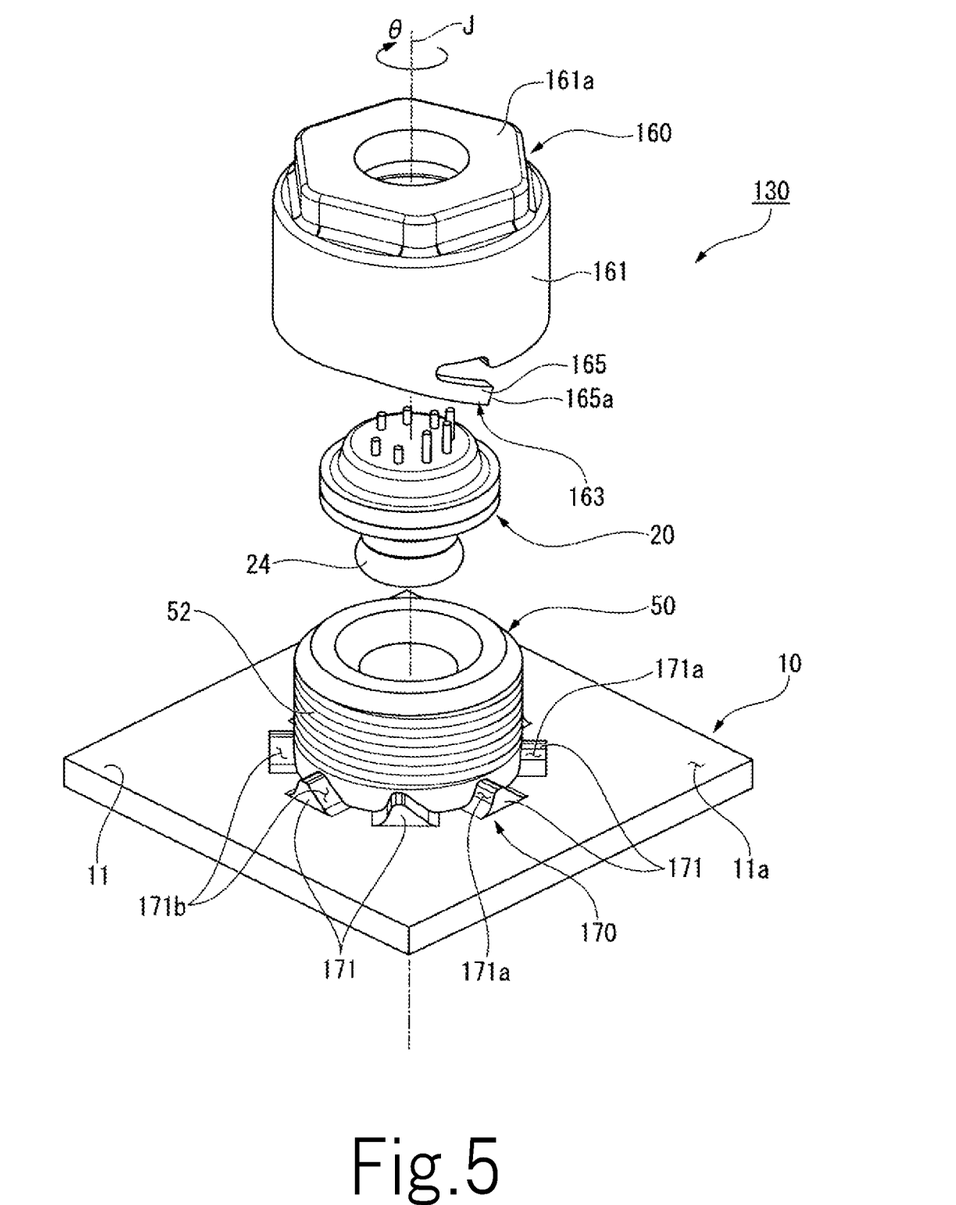
FIG. 5 is a perspective view illustrating a hydraulic sensor attachment structure of a second exemplary embodiment.
Figure 6:
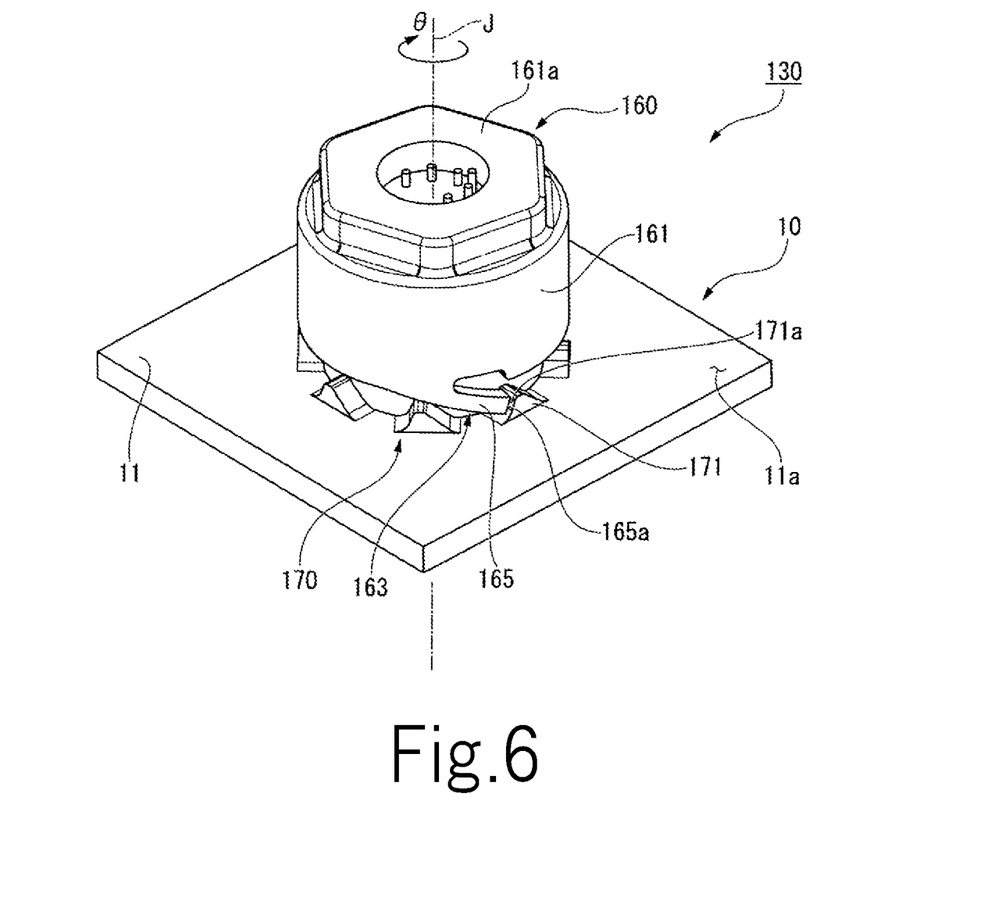
FIG. 6 is a perspective view illustrating the hydraulic sensor attachment structure of the second exemplary embodiment.

FIG. 5 illustrates the unattached state before the hydraulic sensor 20 is attached with a hydraulic sensor attachment structure 130 of the present exemplary embodiment. FIG. 6 illustrates the attached state in which the hydraulic sensor 20 has been attached with the hydraulic sensor attachment structure 130 of the present exemplary embodiment.

As illustrated in FIG. 5, in the hydraulic sensor attachment structure 130 of the present exemplary embodiment, a first rotation suppressing portion 170 includes a plurality of teeth 171 that protrude upwards from the upper surface 11a of the oil passage body 11. The plurality of teeth 171 are arranged side-by-side in an annular manner in the circumferential directions outside the accommodating portion 50 in the radial direction. In the present embodiment, inner surfaces of the teeth 171 in the radial direction are connected to an outer surface of the accommodating portion 50 in the radial direction.

The teeth 171 each include a first contact surface 171a that is oriented in the +θ direction, and an inclined surface 171b that is oriented in the −θ direction. The first contact surfaces 171a are inclined surfaces oriented upwards and inclined towards the −θ direction side with respect to surfaces orthogonal to the circumferential directions. The inclined surfaces 171b are inclined surfaces oriented upwards and inclined towards the +θ direction side with respect to surfaces orthogonal to the circumferential directions. The inclinations of the first contact surfaces 171a with respect to the surfaces orthogonal to the circumferential directions are smaller than the inclinations of the inclined surfaces 171b with respect to the surfaces orthogonal to the circumferential directions. The first contact surfaces 171a and the inclined surfaces 171b are flat surfaces. Note that the first contact surfaces 171a and the inclined surfaces 171b may be curved surfaces, for example.

In a lid 160, an upper end portion 161a of a first cylindrical portion 161 has a regular hexagonal tubular shape. Accordingly, the lid 160 can be rotated easily by, for example, fitting a wrench on the upper end portion 161a and rotating the upper end portion 161a. With the above, the male screw portion 52 and the female screw portion 67 can be fastened to each other in a further firm manner.

Second rotation suppressing portions 163 include second arm portions 165 that extend below the first cylindrical portion 161. The second arm portions 165 extend obliquely downwards in the −θ direction from a lower end of the first cylindrical portion 161. The second arm portions 165 each have a prismatic shape.

The second arm portions 165 can be elastically deformed in the axial direction. Although not illustrated, a pair of second rotation suppressing portions 163 having the central axis J interposed therebetween in the radial direction are provided. The pair of second rotation suppressing portions 163 are disposed in a rotationally symmetrical manner about the central axis J.

As illustrated in FIG. 6, a distal end portion of each second arm portion 165 includes a second contact surface 165a that, in the attached state, can be in contact with the corresponding first contact surface 171a. Accordingly, similar to the first exemplary embodiment, in the attached state, when the lid 160 starts to rotate in the −θ direction, the second contact surfaces 165a come into contact with the first contact surfaces 171a, and the rotation of the lid 160 in the −θ direction is suppressed. Conversely, when the lid 160 is rotated in the +θ direction, the second arm portions 165 become elastically deformed and are moved over the teeth 171. Accordingly, the lid 160 can be rotated easily in the +θ direction.

In the present embodiment, since the second arm portions 165 can be elastically deformed in the axial direction, the second arm portions 165 are elastically deformed upwards by coming into contact with the inclined surfaces 171b of the teeth 171 when the lid 160 is rotated in the +θ direction. With the above, the second arm portions 165 move over the teeth 171, and permit the rotation of the lid 160 in the +θ direction. As described above, in the present embodiment as well, the first rotation suppressing portion 170 and the second rotation suppressing portions 163 constitute a ratchet mechanism that permits the lid 160 to rotate against the accommodating portion 50 in the +θ direction and suppresses the rotation of the lid 160 against the accommodating portion 50 in the −θ direction.

The second contact surfaces 165a are flat surfaces orthogonal to directions to which the second arm portions 165 extend. The inclinations of the second contact surfaces 165a with respect to planes orthogonal to the circumferential directions are the same as the inclinations of the first contact surfaces 171a with respect to planes orthogonal to the circumferential directions. Accordingly, when the first contact surfaces 171a and the second contact surfaces 165a come into contact with each other, the first contact surfaces 171a and the second contact surfaces 165a are parallel to each other. With the above, the first contact surfaces 171a can easily receive the second contact surfaces 165a, and the rotation of the lid 160 in the −θ direction can be suppressed further.

Furthermore, in the present exemplary embodiment, the second contact surfaces 165a are orthogonal to the directions to which the second arm portions 165 extend. Accordingly, when the second contact surfaces 165a are pressed against the first contact surfaces 171a, the second contact surfaces 165a receive reactive force in the directions to which the second arm portions 165 extend. Accordingly, the second arm portions 165 can easily receive the reactive force applied to the second contact surfaces 165a. With the above, damage to the second arm portions 165 can be prevented or reduced. Note that the second contact surfaces 165a may be curved surfaces, for example.

Third Exemplary Embodiment

Figure 7:
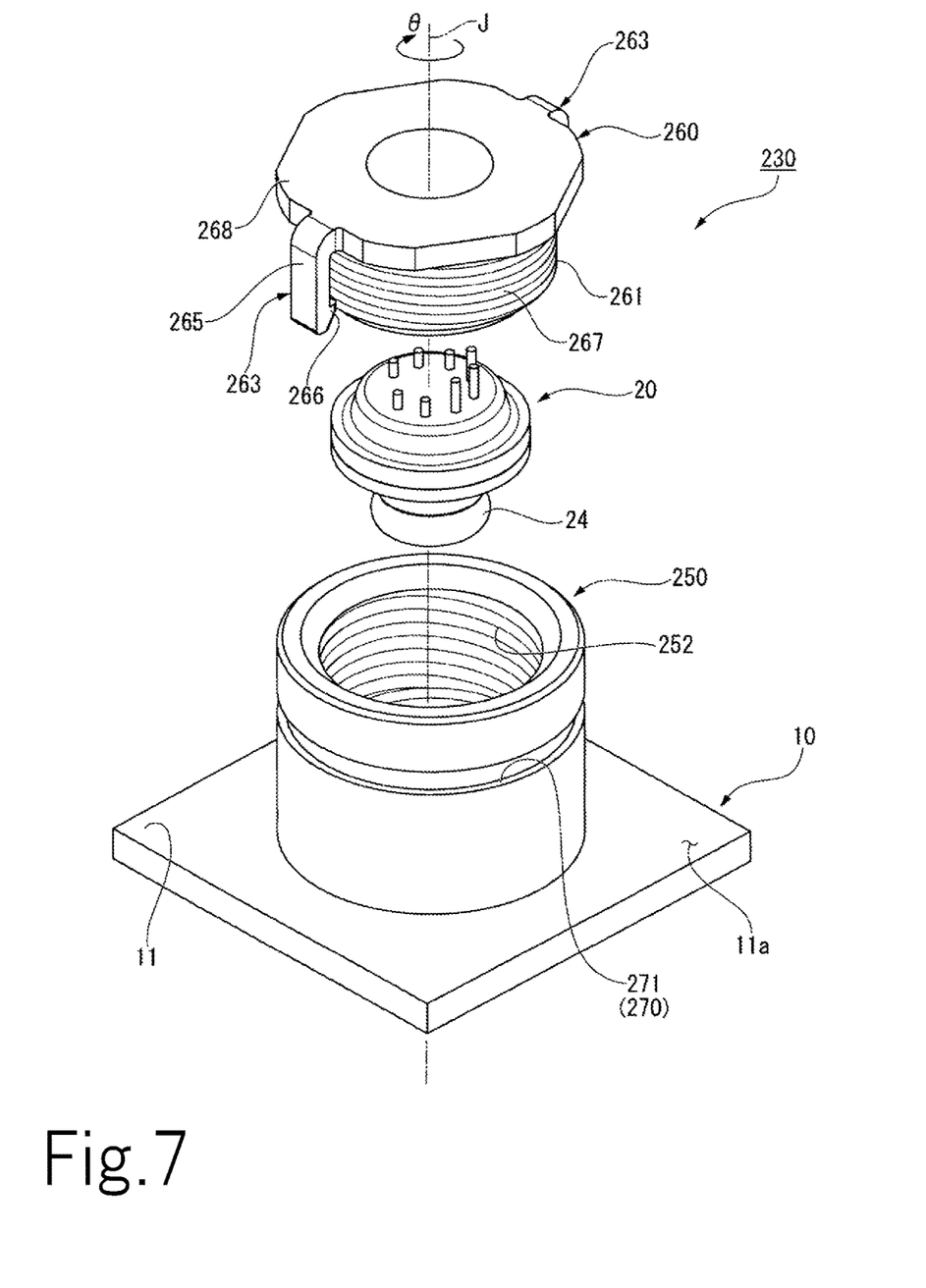
FIG. 7 is a perspective view illustrating a hydraulic sensor attachment structure of a third exemplary embodiment.
Figure 8:
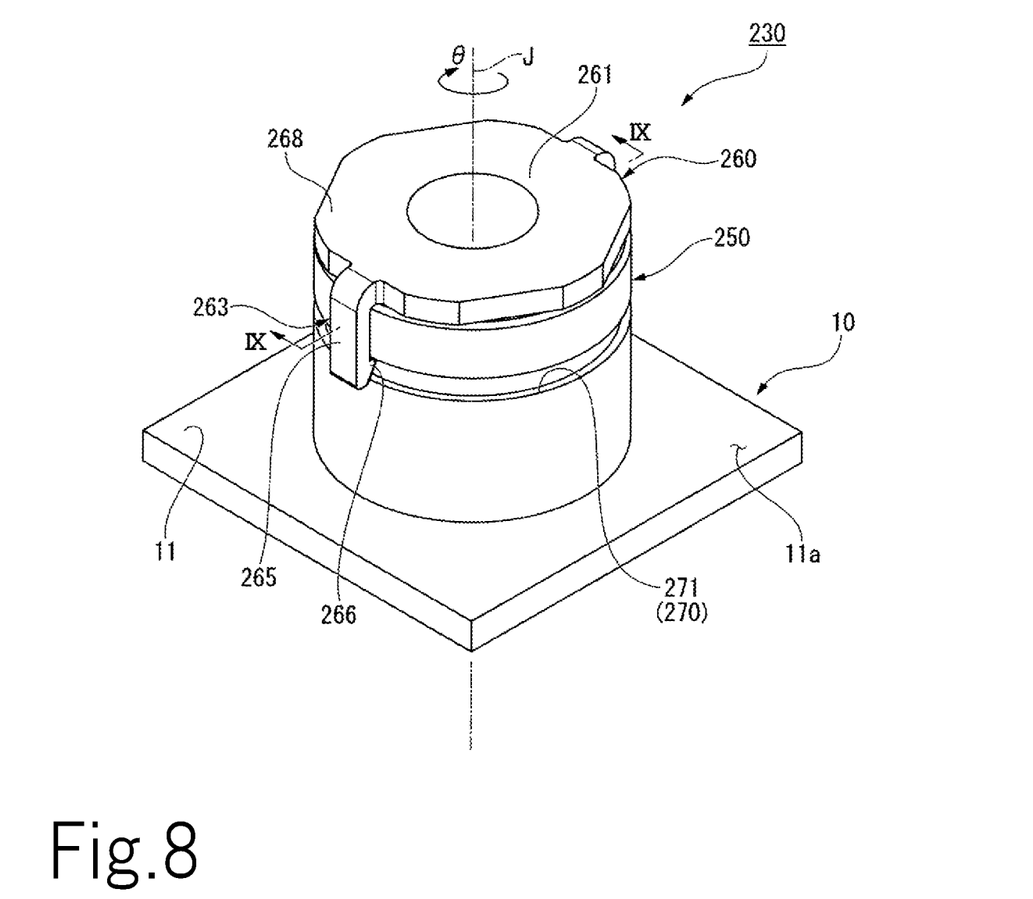
FIG. 8 is a perspective view illustrating the hydraulic sensor attachment structure of the third exemplary embodiment.
Figure 9:
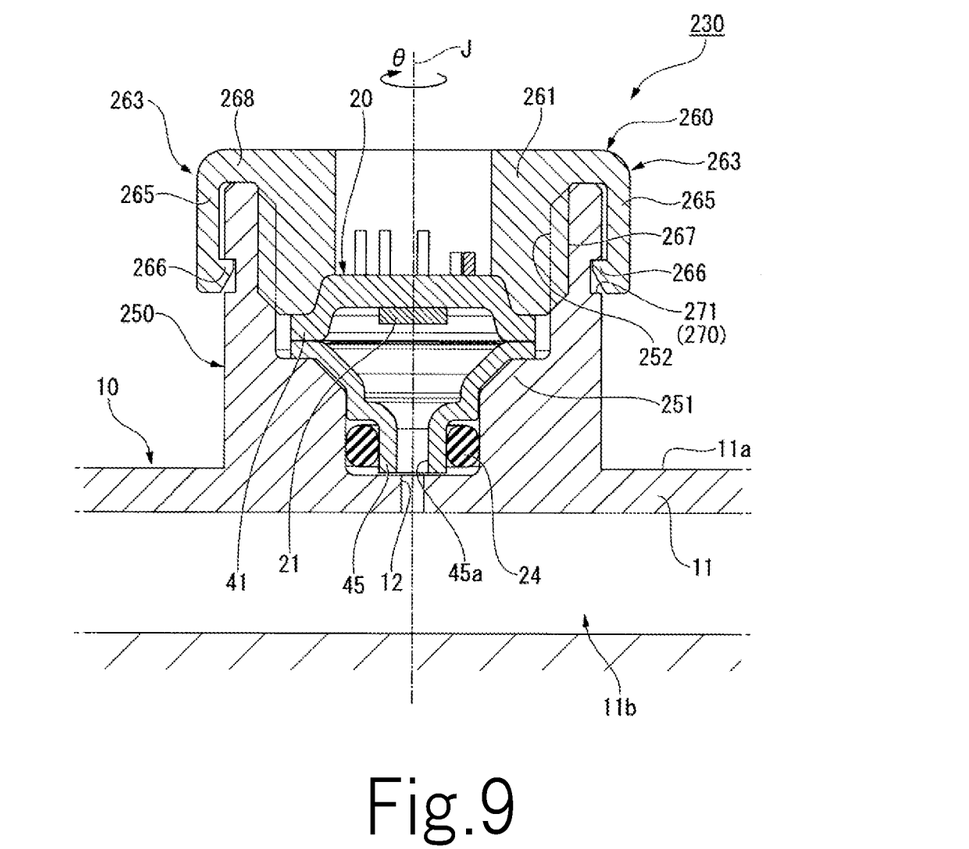
FIG. 9 is a drawing illustrating the hydraulic sensor attachment structure of the third exemplary embodiment and is a sectional view taken along line IX-IX in FIG. 8.

FIG. 7 illustrates the unattached state before the hydraulic sensor 20 is attached with a hydraulic sensor attachment structure 230 of the present exemplary embodiment. FIGS. 8 and 9 illustrate the attached state in which the hydraulic sensor 20 has been attached with the hydraulic sensor attachment structure 230 of the present exemplary embodiment.

As illustrated in FIG. 7, an accommodating portion 250 in the hydraulic sensor attachment structure 230 of the present exemplary embodiment includes a female screw portion 252 serving as a fastening portion. The female screw portion 252 is provided on an inner surface of the accommodating portion 250 in the radial direction. The female screw portion 252 is a helical screw portion extending in the circumferential directions along the inner surface of the accommodating portion 250 in the radial direction. As illustrated in FIG. 9, a support portion 251 in the accommodating portion 250 is provided on the inner surface of the accommodating portion 250 in the radial direction, and protrudes towards the inner side in the radial direction. The support portion 251 has an annular shape formed about the central axis J. The support portion 251 is provided in a lower portion of the inner surface of the accommodating portion 250 in the radial direction, and is connected to the upper surface 11a of the oil passage body 11. By providing the support portion 251, a step portion in which the inside diameter becomes smaller from the upper side towards the lower side is provided on the inner surface of the accommodating portion 250 in the radial direction. In the inner surface of the accommodating portion 250 in the radial direction, the female screw portion 252 is provided in a portion above the support portion 251.

A first rotation suppressing portion 270 includes a groove portion 271 depressed from an outer surface of the accommodating portion 250 in the radial direction towards the inner side in the radial direction. As illustrated in FIGS. 7 and 8, the groove portion 271 has an annular shape that extends in the circumferential directions. The groove portion 271 is disposed in an upper portion of the accommodating portion 250. As illustrated in FIG. 9, in a section orthogonal to the circumferential directions, a shape of an inner surface of the groove portion 271 includes three sides of the sides constituting a rectangular, and the outer side in the radial direction is open. Among the inner surfaces of the groove portion 271, the surface on the upper side and the surface on the lower side are flat annular surfaces. Note that among the inner surfaces of the groove portion 271, the surface on the upper side and the surface on the lower side may be curved surfaces, for example. Furthermore, other than the annular shape, the groove portion 271 may be any shape that extends in the circumferential directions. In such a case, a plurality of groove portions 271 may be provided in the circumferential directions. As illustrated in FIG. 7, a lid 260 includes a second cylindrical portion 261, a flange portion 268, and second rotation suppressing portions 263. The second cylindrical portion 261 has a cylindrical shape formed about the central axis J. Both ends of the second cylindrical portion 261 in the axial direction are open. As illustrated in FIGS. 8 and 9, in the attached state, the second cylindrical portion 261 is disposed inside the accommodating portion 250 in the radial direction. As illustrated in FIG. 7, a male screw portion 267 serving as a fastening portion is provided on an outer surface of the second cylindrical portion 261 in the radial direction. In other words, the lid 260 includes the male screw portion 267. The male screw portion 267 is a helical screw portion that extends in the circumferential directions along the outer surface of the second cylindrical portion 261 in the radial direction.

The flange portion 268 spreads out from an upper portion of the second cylindrical portion 261 towards the outer side in the radial direction. More specifically, the flange portion 268 spreads out from an upper end of the second cylindrical portion 261 towards the outer side in the radial direction. The flange portion 268 has a ring shape formed about the central axis J. An external form of the flange portion 268 viewed in the axial direction is an angularly circular regular hexagonal shape. Accordingly, the lid 260 can be rotated easily by, for example, fitting a wrench on the flange portion 268 and rotating the flange portion 268. As illustrated in FIG. 9, in the attached state, the flange portion 268 is in contact with an upper end of the accommodating portion 250.

The second rotation suppressing portions 263 each include a third arm portion 265 and a second hook portion 266. The third arm portion 265 extend downwards from the outer end portions of the flange portion 268 in the radial direction. In the attached state, the third arm portions 265 are disposed outside of the accommodating portion 250 in the radial direction. The third arm portions 265 can be elastically deformed in the radial direction. The second hook portions 266 protrude from the distal end portions of the third arm portions 265, in other words, from the lower end portion towards the inner side in the radial direction. Upper surfaces of the second hook portions 266 are flat surfaces orthogonal to the axial direction. A pair of second rotation suppressing portions 263 having the central axis J interposed therebetween in the radial direction are provided. Note that the upper surfaces of the second hook portions 266 may be curved surfaces, for example.

The worker first disposes the hydraulic sensor 20 in the accommodating portion 250. In the present embodiment, the worker accommodates the entire hydraulic sensor 20 inside the accommodating portion 250. In a state in which the hydraulic sensor 20 is accommodated inside the accommodating portion 250, the supported portion 41 comes in contact with the support portion 251 from above inside the accommodating portion 250. With the above, the hydraulic sensor 20 is supported by the support portion 251 from below. The lower portion of the hydraulic sensor 20 is disposed inside the support portion 251 in the radial direction.

Subsequently, the worker inserts the second cylindrical portion 261 of the lid 260 into the accommodating portion 250, and engages the male screw portion 267 and the female screw portion 252 with each other. Subsequently, the worker rotates the lid 260 in the +θ direction with respect to the accommodating portion 250. With the above, the male screw portion 267 becomes fastened to the female screw portion 252, and the lid 260 is moved downward. The worker rotates the lid 260 in the +θ direction and fastens the lid 260 until the second cylindrical portion 261 comes into contact with the sensor case 40 from above. In the present embodiment, a lower end of the second cylindrical portion 261 comes into contact with the supported portion 41. With the above, the supported portion 41 is held between the second cylindrical portion 261 and the support portion 251 in the axial direction, and the sensor case 40 is fixed to the accommodating portion 250. The worker can attach the hydraulic sensor 20 to the oil passage body 11 with the hydraulic sensor attachment structure 230 in the above manner.

As illustrated in FIG. 8, in the present exemplary embodiment, in the attached state, the second hook portions 266 are inserted in the groove portion 271 and is caught by the groove portion 271. In other words, the second rotation suppressing portions 263 are caught by the first rotation suppressing portion 270. Accordingly, when the lid 260 is about to rotate in the −θ direction relative to the accommodating portion 250 and move upwards, the upper surfaces of the second hook portions 266 come into contact with an inner surface of an upper side of the groove portion 271. With the above, the lid 260 is suppressed from moving upwards relative to the accommodating portion 250. Accordingly, the lid 260 can be suppressed from rotating in the −θ direction relative to the accommodating portion 250, and loosening of the fastening between the female screw portion 252 and the male screw portion 267 can be suppressed.

When the second hook portions 266 are positioned above the groove portion 271, the second hook portions 266 come into contact with the outer surface of the accommodating portion 250 in the radial direction and are pushed to the outside in the radial direction. Accordingly, the third arm portions 265 are brought to an elastically deformed state deformed towards the outer side in the radial direction. By fastening the male screw portion 267 into the female screw portion 252, the lid 260 moves downward, and when the second hook portions 266 become positioned at the position that is the same as that of the groove portion 271 in the axial direction, the third arm portions 265 are restored and deformed into the inner side in the radial direction. With the above, the second hook portions 266 are inserted in the groove portion 271. In the present embodiment, the second rotation suppressing portions 263 are caught by the first rotation suppressing portion 270 by being snap fitted thereinto in the above manner.

Note that while the fastening portions in the exemplary embodiments described above are helical screw portions, the fastening portions are not limited to the above. The fastening portions that are fastened are not limited to any particular portions and may be any fastening portions that become fastened to each other by being relatively rotated in the circumferential directions. For example, one of the fastening portions may be a groove and the other fastening portion may be a protrusion which is inserted into the groove. In such a case, the entire groove may have a helical shape or a portion thereof may have a helical shape. Furthermore, the groove may include, for example, a straight portion extending in the axial direction, and a portion that is provided at a lower end of the straight portion and that extends in the circumferential directions. In such a case, by inserting a protrusion into the groove from an upper end of the straight portion, by moving the protrusion downwardly to a lower end of the straight portion, and, then, by rotating the protrusion in the circumferential directions, the groove and the protrusion serving as fastening portions can be fastened to each other.

Furthermore, in the exemplary embodiments described above, only a single second rotation suppressing portion may be provided or three or more second rotation suppressing portions may be provided. Furthermore, the plurality of second rotation suppressing portions may be disposed in a rotationally symmetrical manner about the central axis J.

Furthermore, in the exemplary embodiments described above, the first rotation suppressing portion and the second rotation suppressing portions do not have to be provided. Furthermore, the accommodating portion do not have to protrude from the upper surface 11a of the oil passage body 11. The accommodating portion may be, for example, a downwardly depressed hole provided in the upper surface 11a.

Each of the configurations described above may be appropriately combined as long as there is no contradiction among the configurations.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A hydraulic sensor attachment structure that attaches a hydraulic sensor to an oil passage body, the hydraulic sensor attachment structure comprising:
   an accommodating portion;
   a sensor case; and
   a lid disposed over the accommodating portion,
   wherein the oil passage body including an oil passage through which oil flows includes
      the accommodating portion in which at least a portion of the hydraulic sensor is accommodated, and
      a hydraulic pressure detection port exposed to inside of the accommodating portion, the hydraulic pressure detection port connecting the oil passage and the inside of the accommodating portion to each other,
   wherein the hydraulic sensor that measures a pressure of the oil flowing inside the oil passage includes
      a sensor main body, and
      the sensor case that covers the sensor main body,
   wherein the accommodating portion includes a support portion that supports the hydraulic sensor from below,
   wherein the sensor case includes a detection port portion at an underside of the sensor case, the detection port being connected to the hydraulic pressure detection port in a state in which the hydraulic sensor is attached to the oil passage body,
   wherein the accommodating portion includes a fastening portion and the lid includes a fastening portion, the fastening portion of the accommodating portion and the fastening portion of the lid being fastened to each other by being relatively rotated in circumferential directions about a central axis that extends in an up-down direction, and
   wherein the sensor case is held by the support portion and the lid in the up-down direction and is fixed to the oil passage body by fastening the fastening portion of the accommodating portion and the fastening portion of the lid by rotating the lid in one direction of the circumferential directions.

2. The hydraulic sensor attachment structure according to claim 1, further comprising:
   a first rotation suppressing portion provided in the oil passage body,
   wherein the lid includes a second rotation suppressing portion that is caught by the first rotation suppressing portion, and
   wherein the first rotation suppressing portion and the second rotation suppressing portion are hooked to each other and suppress a rotation of the lid relative to the accommodating portion in another direction of the circumferential directions in an attached state in which the sensor case is held between the support portion and the lid in the up-down direction and is fixed to the oil passage body.

3. The hydraulic sensor attachment structure according to claim 2,
   wherein the accommodating portion is a tubular portion formed about the central axis, the accommodating portion protruding upwards from an upper surface of the oil passage body.

4. The hydraulic sensor attachment structure according to claim 3,
   wherein the lid includes a tubular first cylindrical portion disposed outside the accommodating portion in a radial direction, wherein the fastening portion of the accommodating portion is provided on an outer surface of the accommodating portion in the radial direction, and wherein the fastening portion of the lid is provided on an inner surface of the first cylindrical portion in the radial direction.

5. The hydraulic sensor attachment structure according to claim 4, wherein the first rotation suppressing portion has a gear shape including a plurality of teeth protruding outwardly in the radial direction, the first rotation suppressing portion being disposed outside the accommodating portion in the radial direction to surround the accommodating portion, wherein each of the teeth includes a first contact surface that is oriented in the one direction of the circumferential directions, wherein the second rotation suppressing portion includes
a connecting portion that protrudes outwardly in the radial direction from an outer surface of the first cylindrical portion in the radial direction,
a first arm portion that extends in the circumferential directions from an outer end portion of the connecting portion in the radial direction, and
a first hook portion that protrudes downwardly from a distal end portion of the first arm portion in the circumferential directions, wherein the first arm portion is elastically deformable, and wherein the first hook portion includes a second contact surface that is capable of being in contact with the first contact surface in the attached state.

6. The hydraulic sensor attachment structure according to claim 5, wherein the first arm portion is elastically deformable in the radial direction.

7. The hydraulic sensor attachment structure according to claim 4, wherein the first rotation suppressing portion includes a plurality of teeth protruding upward from the upper surface of the oil passage body, wherein the plurality of teeth are arranged side-by-side in an annular shape in the circumferential directions outside the accommodating portion in the radial direction, wherein each of the teeth includes a first contact surface that is oriented in the one direction of the circumferential directions, wherein the second rotation suppressing portion incudes a second arm portion that extends below the first cylindrical portion, wherein the second arm portion is elastically deformable, and wherein a distal end portion of the second arm portion includes a second contact surface that is capable of being in contact with the first contact surface in the attached state.

8. The hydraulic sensor attachment structure according to claim 7, wherein the second arm portion is elastically deformable in the up-down direction.

9. The hydraulic sensor attachment structure according to claim 5, wherein the first rotation suppressing portion and the second rotation suppressing portion constitute a ratchet mechanism that permits the rotation of the lid relative to the accommodating portion in the one direction of the circumferential directions and that suppresses the rotation of the lid relative to the accommodating portion in the other direction of the circumferential directions.

10. The hydraulic sensor attachment structure according to claim 3, wherein the lid includes a second cylindrical portion disposed on an inner side of the accommodating portion in the radial direction, wherein the fastening portion of the accommodating portion is provided on an inner surface of the accommodating portion in the radial direction, and wherein the fastening portion of the lid is provided on an outer surface of the second cylindrical portion in the radial direction.

11. The hydraulic sensor attachment structure according to claim 10, wherein the first rotation suppressing portion includes a groove portion that is depressed from an outer surface of the accommodating portion in the radial direction towards the inner side in the radial direction, wherein the groove portion extends in the circumferential directions, wherein the lid includes a flange portion that extends from an upper portion of the second cylindrical portion towards the outer side in the radial direction, wherein the second rotation suppressing portion includes
a third arm portion that extends downward from an outer end portion in the radial direction of the flange portion, and
a second hook portion that protrudes from a distal end portion of the third arm portion towards the inner side in the radial direction, and wherein the second hook portion is inserted in the groove portion and caught by the groove portion in the attached state.

* * * * *